United States Patent [19]
Long et al.

[11] 3,724,182
[45] Apr. 3, 1973

[54] ROTARY LAWNMOWER ATTACHMENT

[76] Inventors: Marvin B. Long, 109 South 8th; William A. Crowe, 807 West Main Street, both of Hamilton, Mont. 59840

[22] Filed: July 6, 1971

[21] Appl. No.: 159,952

[52] U.S. Cl.....................56/10.4, 37/43 K, 56/12.7, 56/255, 56/289, 56/295
[51] Int. Cl.............................................A01d 75/18
[58] Field of Search.........37/43 L, 53; 56/10.4, 12.7, 56/17.5, 59, 69, 96, 42, 193, 544, 255, 289, 295, 400.02, 400.03; 172/15, 110, 111; 15/79, 180, 256.5

[56] References Cited

UNITED STATES PATENTS

| | | | |
|---|---|---|---|
| 3,373,514 | 3/1968 | Forren | 37/43 L |
| 2,545,173 | 3/1951 | Shaw | 172/59 X |
| 3,321,026 | 5/1967 | Hubbard | 172/111 X |
| 3,117,633 | 1/1964 | Hosek | 172/96 X |
| 2,984,919 | 5/1961 | Stoddard | 37/43 L |
| 3,048,869 | 8/1962 | Beatty | 37/43 L |
| 3,014,333 | 12/1961 | Clark, Jr. | 56/295 |
| 2,991,567 | 7/1961 | Erickson | 37/43 L |
| 3,488,931 | 1/1970 | Matthews | 56/12.7 |
| 3,050,925 | 8/1962 | West et al. | 56/295 |
| 2,634,571 | 4/1953 | Lawrence et al. | 56/17.5 |

*Primary Examiner*—Robert E. Pulfrey
*Assistant Examiner*—Eugene H. Eickholt
*Attorney*—Robert G. West et al.

[57] ABSTRACT

Removably mounted in horizontal attitude on the lower end of the vertical drive shaft of a rotary lawnmower is an elongated bar carrying on its outer ends a pair of hinged paddles which are spring-urged toward a substantially vertical attitude. The paddles are located on the trailing edges of the bar ends so that impact with a rock or stationary object will temporarily deflect the paddle against spring bias without damage to the paddle. The paddles, per se, serve as leaf, grass or loose snow blowers; and by fitting the paddles with one or more tines, a scarifying member is afforded, permitting the attachment to be used either to scrape hard snow and ice or to renovate lawns.

1 Claim, 4 Drawing Figures

PATENTED APR 3 1973

INVENTOR.
MARVIN B. LONG
WILLIAM A. CROWE
BY
Lothrop & West
ATTORNEYS

PATENTED APR 3 1973 3,724,182

INVENTOR.
MARVIN B. LONG
WILLIAM A. CROWE
BY
Lothrop & West
ATTORNEYS

ROTARY LAWNMOWER ATTACHMENT

The invention relates to improvements in attachments for rotary lawnmowers.

The patent literature is replete with examples of lawnmower-mounted attachments of various kinds, exemplary being B. Watanabe U.S. Pat. No. 2,720,071 dated Oct. 11, 1955; W. H. Draughon U. S. Pat. No. 2,863,162 dated Dec. 9, 1958; S. F. Bright U.S. Pat. No. 3,015,929 dated Jan. 9, 1962; and, R. P. Hosek U.S. Pat. No. 3,117,633 dated Jan. 14, 1964.

For the most part, however, the prior art devices disclose mounting structures for the operating members which are moderately complicated and expensive.

It is therefore an object of the invention to provide a rotary lawnmower attachment which is not only relatively inexpensive but which is also rugged and durable.

It is another object of the invention to provide a lawnmower attachment which is versatile in that it can be used for a variety of purposes and in a number of different environments.

It is a further object of the invention to provide an attachment which can readily be secured to and removed from substantially all brands and grades of rotary lawnmowers presently on the market.

It is another object of the invention to provide a generally improved rotary lawnmower attachment.

Other objects, together with the foregoing, are attained in the embodiments described in the following description and shown in the accompanying drawings in which.

Figure 1:
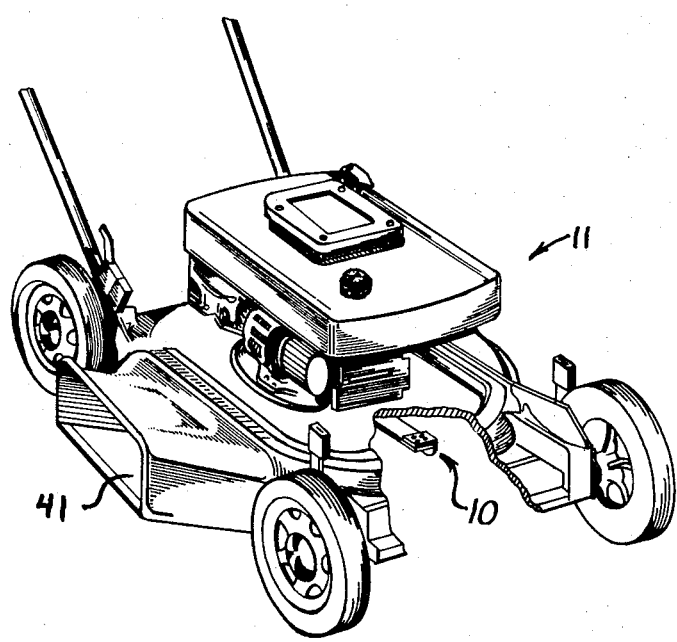
FIG. 1 is a fragmentary perspective view of a typical rotary lawnmower with a portion broken away to reveal a portion of an attachment in installed position.

While the lawnmower attachment of the invention is susceptible of numerous physical embodiments, depending upon the environment and requirements of use, substantial numbers of the herein shown and described embodiments have been made, tested and used, and all have performed in an eminently satisfactory manner.

The attachment of the invention, generally designated by the reference numeral 10, is mounted on the lower end of the customary vertical drive shaft of a rotary lawnmower 11. The attachment, in fact, is substituted for the usual lawnmower blade, not shown, by removing the blade fastenings and blade, and securing the attachment in horizontal attitude in lieu of the blade.

In the forms of attachment shown in FIGS. 1–4 an elongated bar 12, or plate, with a central opening 13 to accommodate the vertical drive shaft has mounted on the opposite ends a pair of operating members, generally designated by the reference numeral 14.

Each of the operating members 14 is substantially identical to the other and a description of one will therefore serve to describe both.

Figure 2:
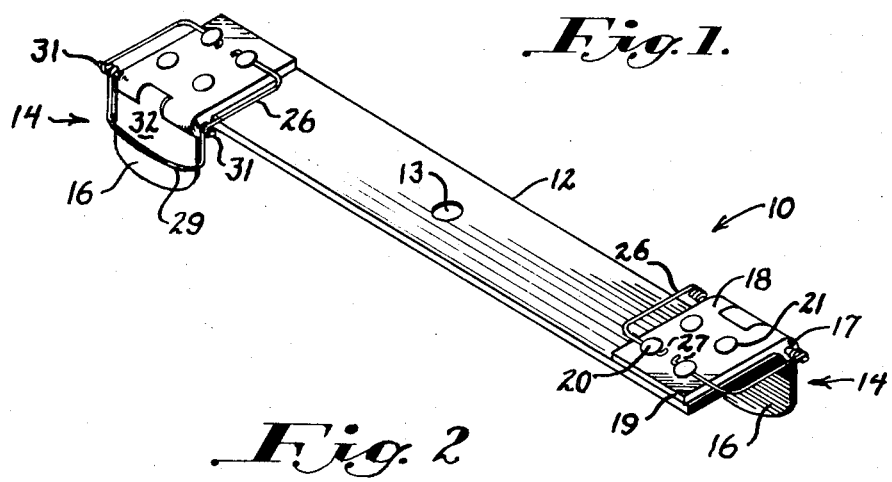
FIG. 2 is a perspective view to an enlarged scale of one form of attachment.

In the embodiment illustrated in FIGS. 1 and 2, the operating member 14 comprises a paddle 16 hingeably mounted on a horizontal hinge pin 17 having an axis substantially parallel to the longitudinal axis of the elongated bar 12. The hinge pin 17, in turn, is mounted on the arcuate trailing edge 18 of a plate 19 secured, as by pairs of rivets 20 and 21 to the bar 12.

Figure 3:
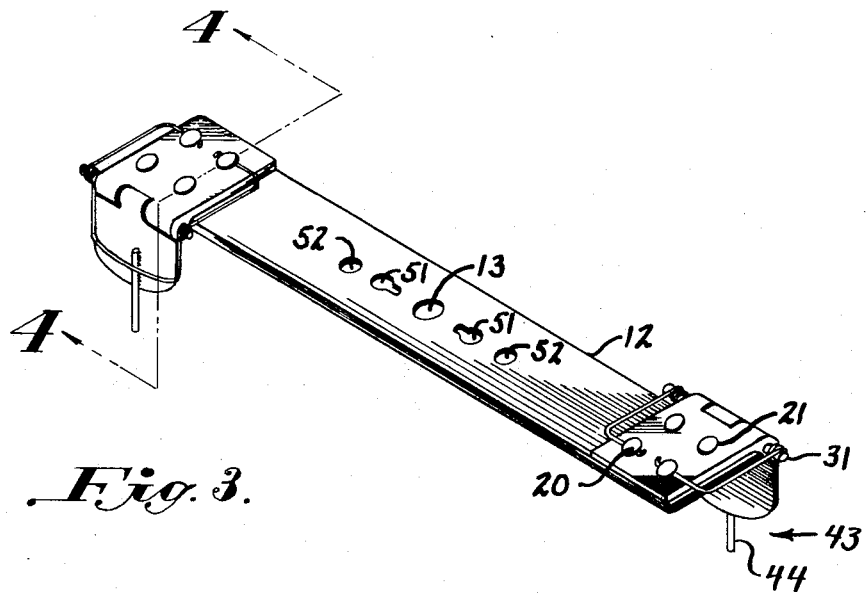
FIG. 3 is a perspective view to an enlarged scale of another form of attachment.

The hinged paddle member 16 is approximately vertical during usual operation, although preferably it is raked at a slight angle to the vertical with its bottom end trailing by a small amount as the attachment is rotated by the shaft in a clockwise direction in the positions of the attachments shown in FIGS. 1–3.

A bail type of spring 26 serves to bias the paddle 16 into substantially vertical attitude, yet allows the paddle to yield should the paddle strike a rock or other object which could damage the paddle were the paddle fixed.

The spring 26 has its opposite free ends 27 secured to the heads 22 of the rivets 20, the wire ends extending through openings in the rivet heads 22 and being laterally bent to anchor the wires in place. The central, bight or bail portion 29, of the spring is wound over end extensions 31 of the hinge pin 17 and bent downwardly to engage the after surface 32 of the paddle. The bail portion 29 biases the paddle in a forward direction, in the arcuate, or rather, helical, path assumed by the attachment as it rotates in a clockwise direction at a very considerably velocity, and at the same time progresses forwardly over the ground in company with the machine itself. A limit stop can be provided, such as the rod 35 (see FIG. 4) welded to the bottom of the arcuate portion 18, the rod 35 abutting the paddle in vertical position of the paddle.

Figure 4:
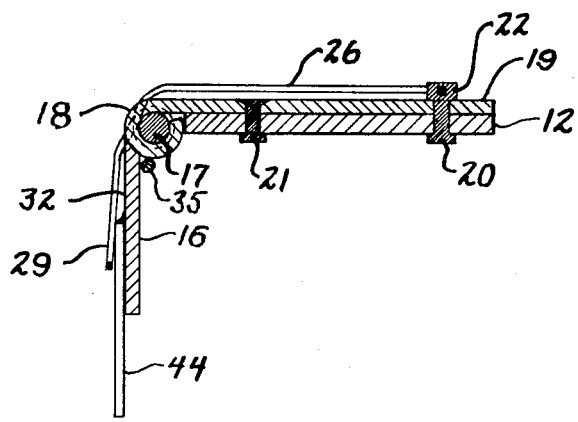
FIG. 4 is a sectional view to a further enlarged scale, the plane of the section being indicated by the line 4—4 in FIG. 3.

The two vertical paddle members 16 effectively serve not only to dislodge loose material, such as leaves, twigs, grass cuttings and powdery snow, but also to blow such material laterally out through the discharge conduit 41.

Where hard packed snow or ice is to be encountered, or where a lawn is to be renovated, as by scarifying, the form of device shown in FIG. 4 is substituted for the FIG. 2 type of attachment. The FIG. 4 variation is substantially similar to the FIG. 2 form except that the FIG. 4 device carries a scarifying member 43, such as a vertical tine 44, secured to the after surface of each paddle and projecting downwardly far enough to reach and extend a short distance into the subjacent surface, which may be ground, turf, packed snow, or the like. FIG. 4 also illustrates the manner in which additional pairs of openings, such as the keyholes 51 and apertures 52 can be provided in the bar 12 so as to increase the number of lawnmower machines which can accommodate the present attachment.

It will be noted that the FIG. 4 form of device not only provides a scarifying operation by reason of the tines 44, which preferably are of springwire material, but also affords a very effective blower action as a result of the paddle members. Thus, in one pass, a path can be scarified and the loose material dislodged and laterally discharged.

It can therefore be seen that we have provided a rotary lawnmower attachment which is not only light in weight and compact in size, but which is also versatile in that it can perform a variety of tasks.

In other words, the device can not only be used in a garden environment for the removal of debris, renovation of turf and scarifying of ground surfaces, but also can be utilized to great advantage in the winter season in removing snow, such as from a stretch of walk or driveway. The high rotational velocity of the paddle members creates a fan, or blower, action which is capable of dislodging and impelling very substantial quantities of snow away from the forward path of the lawnmower and the attachment secured thereto, thereby providing a machine which is useful in all seasons.

What is claimed is:

1. A rotary lawnmower attachment comprising:
   a. an elongated bar horizontally mounted on the vertical drive shaft of a rotary lawnmower for rotation with said shaft;
   b. a pair of flat paddles hingeably mounted at their upper ends on the trailing edges of said bar adjacent the extremities thereof, said paddles each being movable about a horizontal pivot axis parallel to the longitudinal axis of said bar between a first substantially vertical position and a second position inclined downwardly and in a trailing direction opposite and substantially tangent to the path of forward movement of said paddle as said bar rotates with said shaft;
   c. a pair of spring wire bails each secured at its ends to said bar adjacent said extremities of said bar, said bail also including a bight portion in biasing engagement with the adjacent one of said paddles and urging said paddle from said second inclined position toward said first substantially vertical position; and,
   d. stop means for limiting the extent of said forward movement of said paddles.

* * * * *